United States Patent [19]

Frick

[11] 4,186,599

[45] Feb. 5, 1980

[54] VORTEX SHEDDING FLOWMETER ASSEMBLY

[75] Inventor: Roger L. Frick, Eden Prairie, Minn.

[73] Assignee: Rosemount Inc., Eden Prairie, Minn.

[21] Appl. No.: 864,828

[22] Filed: Dec. 27, 1977

Related U.S. Application Data

[63] Continuation of Ser. No. 755,357, Dec. 29, 1976, abandoned.

[51] Int. Cl.² .................................................. G01F 1/32
[52] U.S. Cl. ................................................. 73/194 VS
[58] Field of Search ...................................... 73/194 VS

[56] References Cited

U.S. PATENT DOCUMENTS

| 1,215,135 | 2/1917 | Fisher . | |
| 3,948,097 | 4/1976 | Kurita et al. | 73/194 |
| 3,979,954 | 9/1976 | Ide et al. | 73/194 |

FOREIGN PATENT DOCUMENTS 50-9015  3/1975  Japan ........................................ 73/194

OTHER PUBLICATIONS

Owen "The Aerodynamics of Aircraft and Other Things," in Aeronautical Journal, 8/73, pp. 383-405.
Spivack "Vortex Frequency and Flow Pattern in the Wake of Two Parallel Cylinders at Varied Spacing Normal to an Air Stream," in Journal of Aeronautical Sciences, Je.46, pp. 289-301.
Ramamurthy et al., "Velocity Scales for Constrained Flows," or Aeronautical Journal, 1/75, pp. 38-41.

*Primary Examiner*—Herbert Goldstein
*Attorney, Agent, or Firm*—Kinney, Lange, Braddock, Westman and Fairbairn

[57] ABSTRACT

The present invention relates to a flow velocity measuring apparatus which provides a distinct, measurable pattern of vortices known as Karman Vortex Generation. The apparatus is arranged to include a plurality of vortex producing obstructions which co-operate to provide a high signal output. The flowmeter is designed to use a vibration sensor which is accessible from the exterior of the pipe carrying the fluid being measured.

19 Claims, 9 Drawing Figures

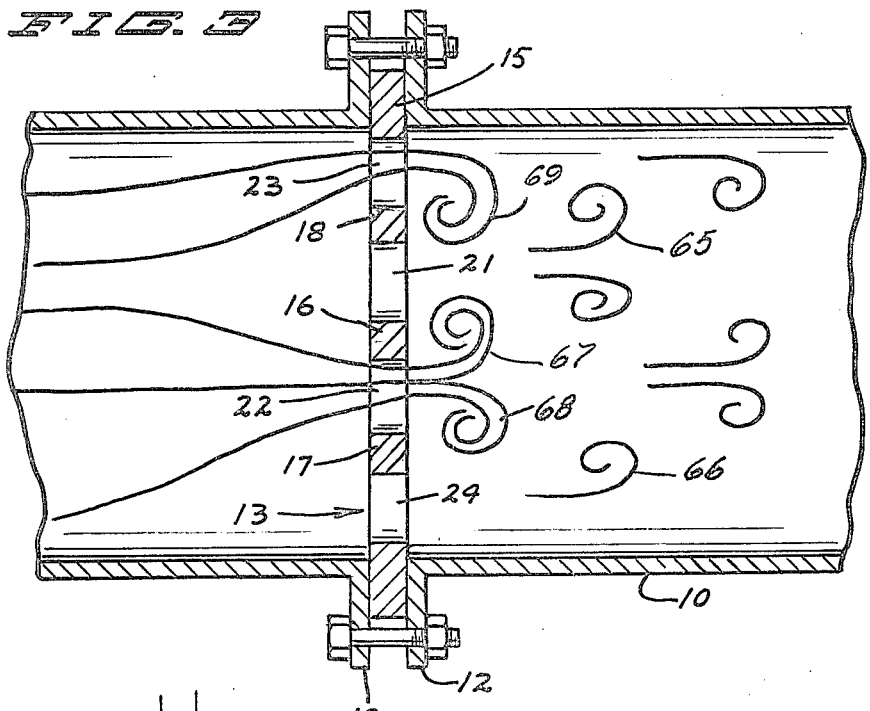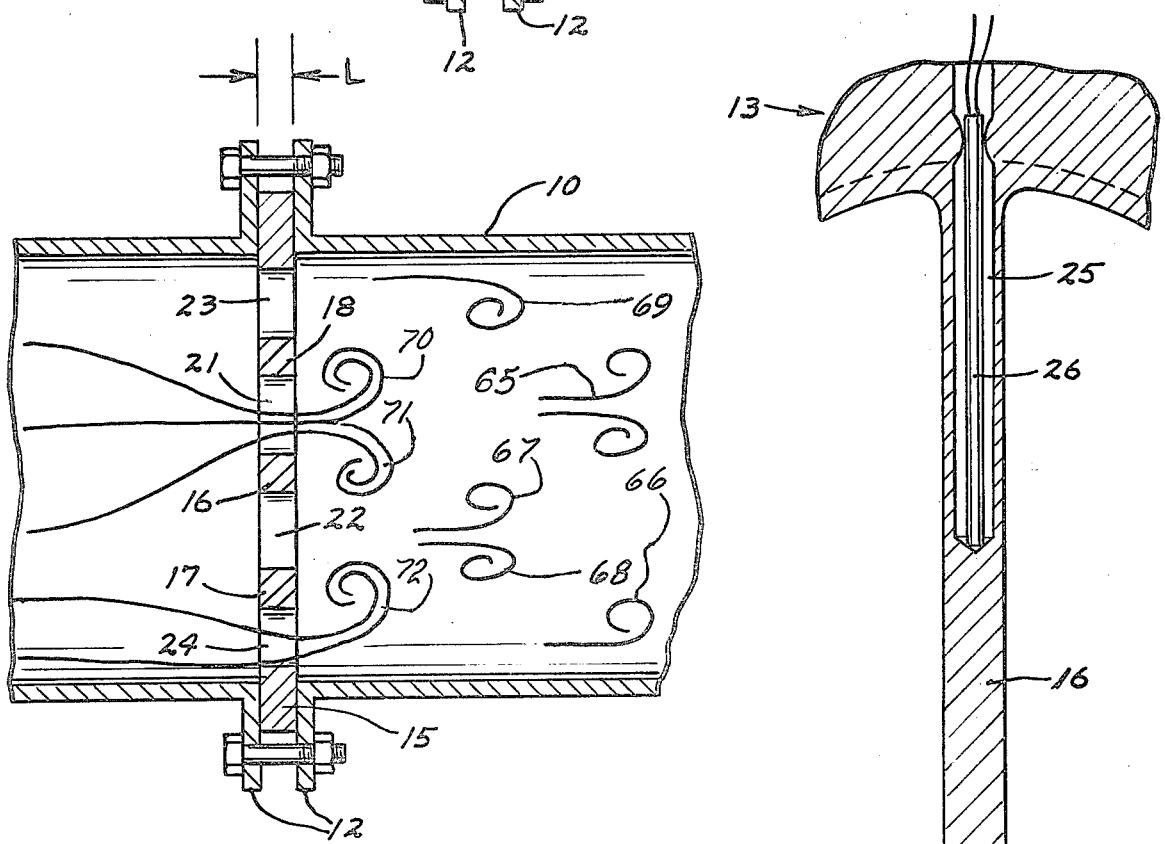

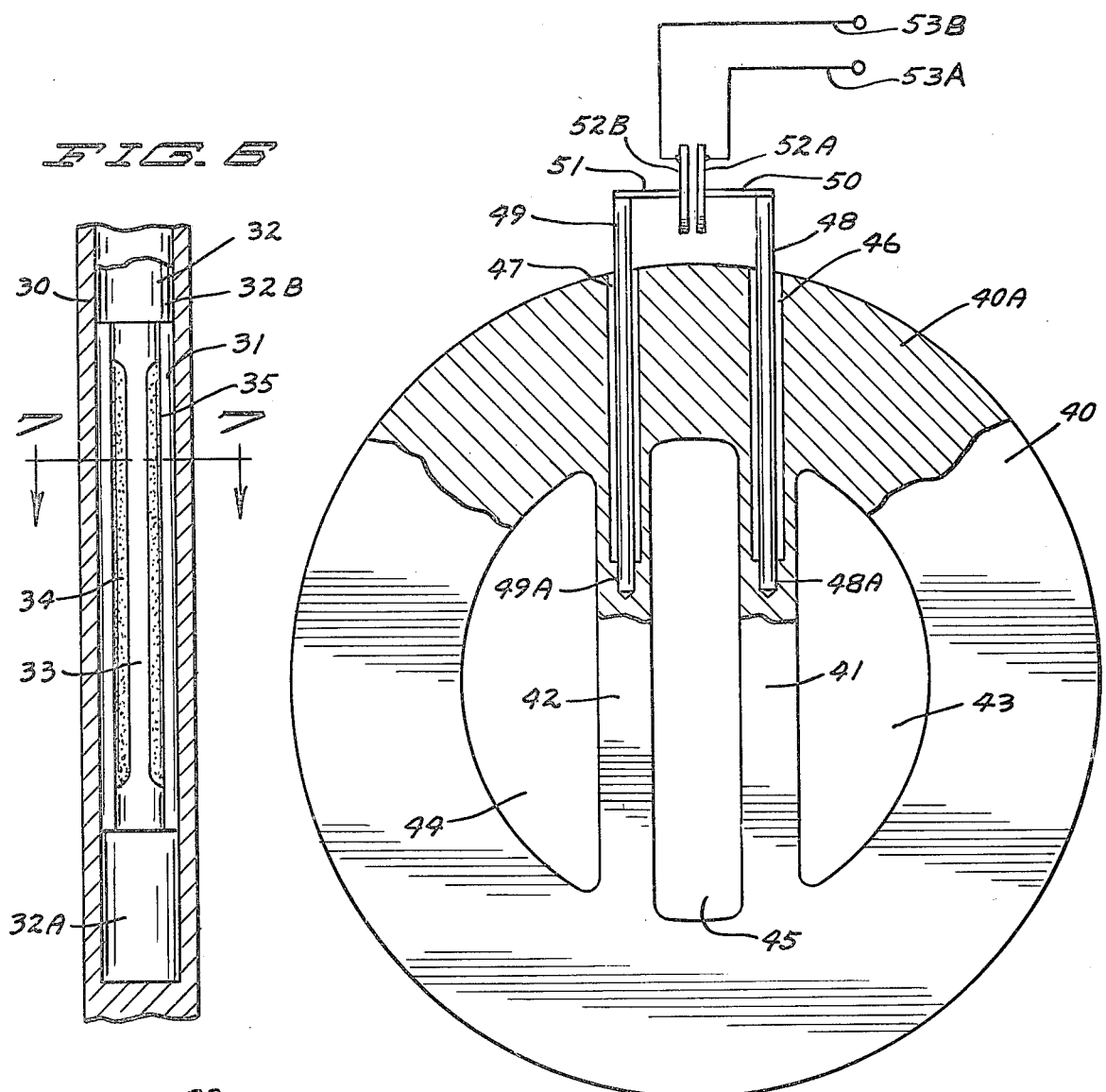
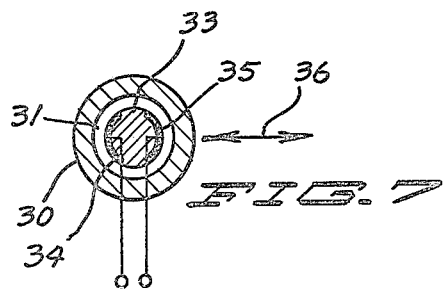
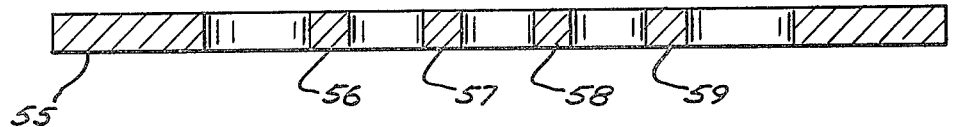

VORTEX SHEDDING FLOWMETER ASSEMBLY

This is a continuation of application Ser. No. 755,357, filed Dec. 29, 1976 now abandoned.

BACKGROUND OF THE INVENTION

1. Field of the Invention

The present invention relates to vortex shedding flow measuring devices.

2. Prior Art

In the prior art several patents have illustrated the basic concept of providing an obstacle or body in a fluid flow path which causes vortices to be formed and which vortices set up vibrations or oscillations in the obstacle. Measurement of the vibrations has long been known to provide an indication of the velocity of flow past the obstacle. Devices of the general type are shown in U.S. Pat. No. 3,972,232 wherein a piezoelectric pick-up is used for determining the vibration of the obstacle, and wherein a particular shape of obstacle is provided.

A single bar, flat plate assembly which can be inserted into a conduit is shown in Japanese Utility Model Publication No. 9015/1975. A vortex flowmeter which shows a plurality of bodies arranged in a particular orientation in relation to the direction of flow is shown in Japanese Patent Disclosure No. 20553/1973. Particular attention should be given to FIG. 7(h). The teaching is that a particular spacing relationship is desired between two laterally spaced "pillars" and a downstream pillar to obtain the desired action.

Another type of vortex flowmeter is shown in U.S. Pat. No. 3,796,096.

The use of a bluff body as the vortex shedding obstacle or body is illustrated in U.S. Pat. No. 3,572,117, and probe rods made of a polygonal cross section are disclosed in U.S. Pat. No. 2,813,424. A flowmeter using rectangular vortex shedding probes in one embodiment, wherein the wall of the probe is intended to be the vortex shedding obstacle as well as the moving or sensing element is shown in U.S. Pat. No. 3,927,566.

U.S. Pat. No. 3,948,097 is of interest in that it provides a plurality of slots in a vortex shedding ostacle with the slots arranged to extend transverse to the flow direction, and these slots are alleged to assist in the production and detection of vortices.

Another patent which illustrates three individual flowmeters in a single pipe, is U.S. Pat. No. 3,979,954. Each of the meters generates a separate signal, and the separate signals can be combined to provide an output that is substantially proportional to the flow rate of the fluid.

Investigations of the effects of multiple bars in flow have been made for the purpose of predicting and minimizing structural vibrations in devices such as boiler tubes.

SUMMARY OF THE INVENTION

The present invention relates to a vortex shedding flowmeter having multiple bodies or bars forming flow obstructions in a single sensor assembly which provides a strong signal and satisfactory linearity. The sensor comprises a generally flat plate that is formed with slots that define spaced apart bars which are spaced across the diameter of the flow pipe. The sensor can be formed from a plate which will take about the same space as an orifice plate. The width and spacing of the bars is selected to provide a stable vortex pattern.

Because the device provides a frequency output which is a higher frequency than conventional vortex meters using a single larger bar, a simpler sensing circuit may be used and faster response is possible. The vortex shedding bodies or bars, when made in cooperation with other shedding bodies form a single plate and have sufficient deflection so the movement of the bars can be sensed as the indication of vortex shedding. The bars are aligned transversely of the flow direction but do not operate in connection with any other bars positioned upstream or downstream from the spaced bars.

Additionally, the construction provides for easily inserted or removable sensors without dismantling the flowmeter or the conduit carrying the fluid flow being sensed.

Because the sensor will fit in place of an ordinary orifice plate in a flow line, the sensor can be used interchangeably with orifice plates that are now commonly used in differential pressure sensing of flow in conduits.

BRIEF DESCRIPTION OF THE DRAWINGS

FIG. 3 is a sectional view taken as on line 3—3 in FIG. 1, and illustrating the vortex generation in a first stage of operation;

FIG. 4 is a sectional view taken on the same line as FIG. 3 with the showing of vortex generation in a second stage;

FIG. 5 is a vertical sectional view of a center one of the vortex forming bars showing a signal pick-up installed therein;

FIG. 6 is a vertical sectional view of a typical vortex forming bar used in a vortex flowmeter having a capacitive type sensor installed therein;

FIG. 7 is a sectional view taken as on line 7—7 in FIG. 6;

FIG. 8 is a plan view of a modified vortex flowmeter made according to the present invention showing a modified sensor also installed in such flowmeter; and FIG. 9 is a cross sectional view of a further modified flowmeter taken generally along the same lines as FIGS. 3 and 4 showing a flowmeter with four vortex forming bars.

DESCRIPTION OF THE PREFERRED EMBODIMENTS

Figure 1:
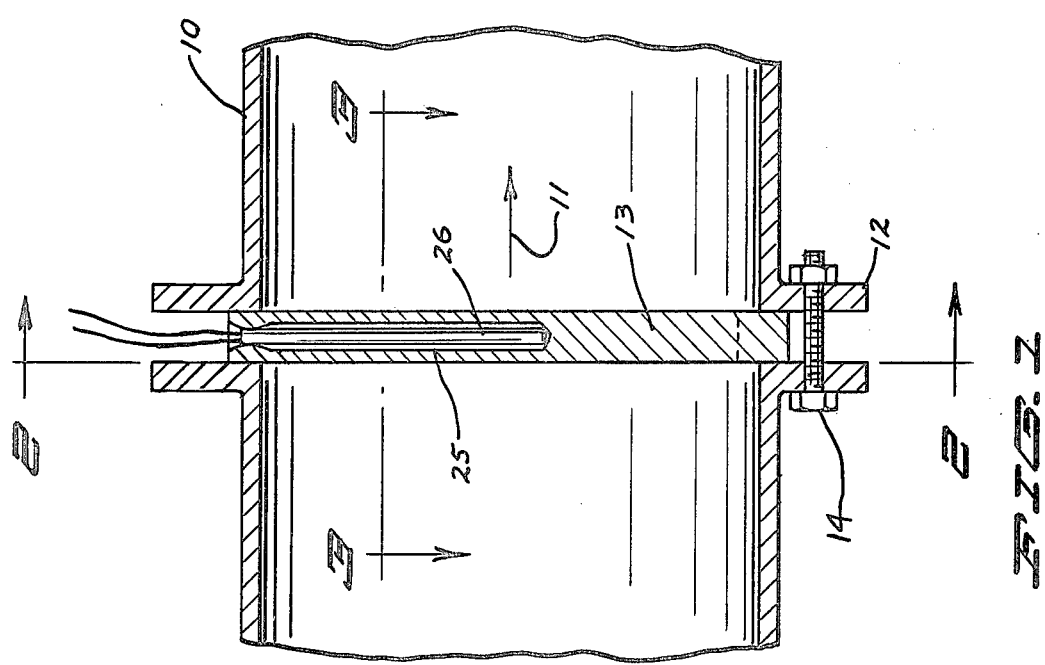
FIG. 1 is a typical sectional view of a portion of a fluid carrying conduit having a vortex shedding flowmeter installed therein.

FIG. 1 shows a fluid carrying conduit 10 which is carrying fluid generally in the direction indicated by arrow 11 and which has a pair of flange type couplers 12, one on each of two conduit sections, which are spaced apart to receive and sandwich a vortex flowmeter plate assembly illustrated generally at 13. The flanges are held together with suitable coupling bolts 14, and they clamp and seal onto the vortex shedding flowmeter plate 13.

The flowmeter plate 13 in this form of the invention is made from a circular plate with orifices or flow apertures cut in the plate to define the cross bars. As can perphaps best be seen in FIG. 2, there is a perimeter or annular rim or ring 15, and a center flow obstructing bar 16, a flow obstructing bar 17 adjacent a first side thereof, and a flow obstructing bar 18 adjacent a second side thereof. These bars or bodies 16, 17 and 18 are separated by suitable orifices or apertures (or slots) 21 and 22 on opposite sides of the center body 16 which are of equal size and shape, and orifices or apertures (or slots) 23 and 24 to the outside of the bars 17 and 18, which orifices 23 and 24 are also of equal shape and size. The outer edges of each of the orifices or apertures indicated at 21A, 22A, 23A, and 24A are part circular and these edges define the effective flow diameter D of the flowmeter assembly.

The flowmeter plate 13 is relatively thin in direction of the fluid stream 11, and the flow obstruction bodies or bars 16, 17 and 18 are formed to be substantially square (rectilinear) in cross section as shown in FIGS. 3 and 4. The bars 16, 17 and 18 are made to cause flow separation, causing vortices to be formed and shed from the bars along their side surfaces (the surfaces parallel to the flow direction).

The center bar 16 has a receptacle 25 defined therein, leading from the exterior edge of the rim 15 and which is open and accessible between the flanges 12. A piezoelectric sensor, which is a motion sensor, indicated generally at 26, or some other suitable motion sensor is placed into the receptacle 25 and can be held in the opening in a suitable manner. The sensor 26 is utilized for sensing vibrations of the center bar 16 caused by the formation and shedding of vortices as the fluid in the conduit flows past the bars.

Figure 2:
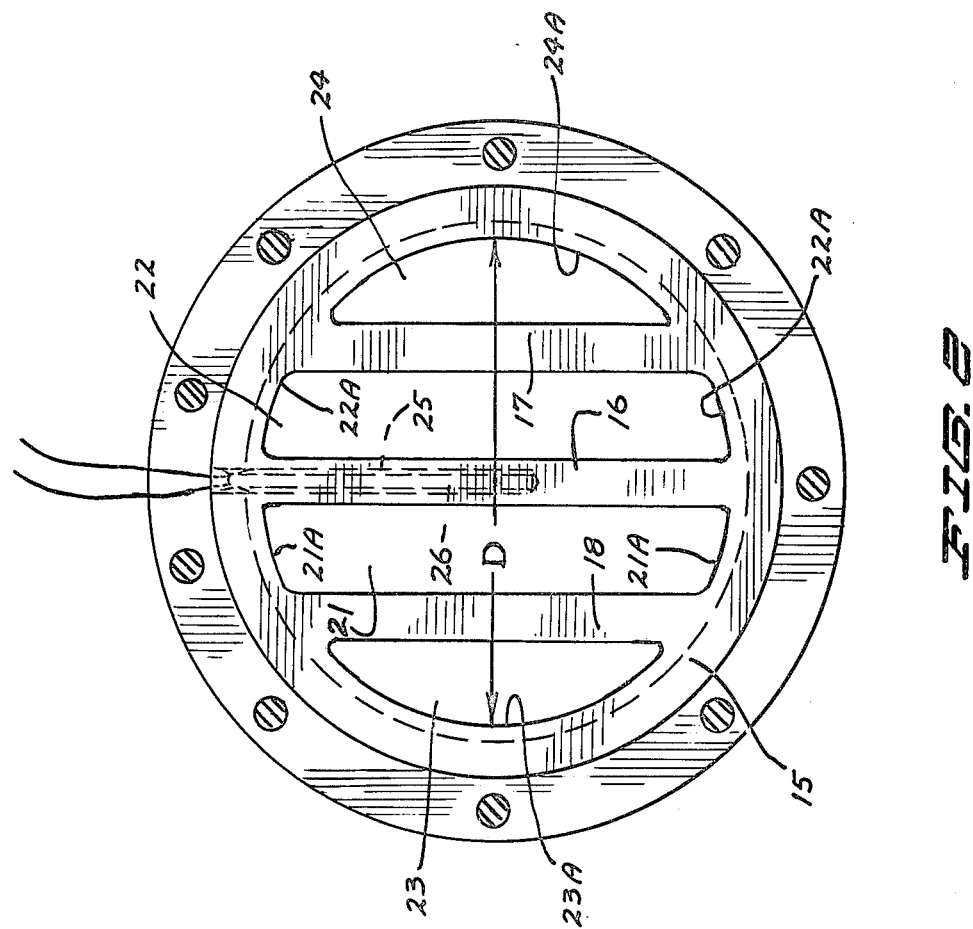
FIG. 2 is a plan view of the vortex shedding flowmeter of the present invention taken as on line 2—2 in FIG. 1.

It has been found that preferably the sum of the widths of the bars 16, 17 and 18 should be approximately 0.2 to 0.3 of the diameter of the effective flow diameter of the plate. That is, considering the width in diametral direction of each of the members W, and the diameter of the effective opening in the plate D, the sum of all of the widths of the plurality of bars or bodies on the plate would equal 0.2D to 0.3D. This diameter D as shown in FIG. 2 is the effective flow diameter defined by the edges of the orifices or apertures in the meter assembly, rather than the actual diameter of the conduit.

When a plurality of spaced obstruction bodies are placed across the conduit and are commonly mounted to a rim as shown, the rim or plate can be slipped into position in place of a common orifice plate without modifying existing mounting members.

The center bar 16 is centered on a diametral line of the flow conduit, and the bars 17 and 18 are spaced an equal distance from the center bar and from the sides of the conduit.

It has been found that when a plurality of the obstruction bars or bodies such as 17, 18 and 19 which are transversely aligned across the conduit are utilized, the formation of vortices will tend to shift across the diameter of the conduit, so that primary or strong vortices are formed alternately along the sides of the bars as shown in FIGS. 3 and 4. Note that no upstream or downstream bars or obstructions are used, but only the bars centered on a common plane perpendicular to the flow direction.

As a first step in explanation, previously formed vortices indicated at 65 and 66 will be downstream from the flow sensor, and the primary or strong vortices will be formed along the sides of the bars 16 and 17 defining orifice or opening 22. These vortices are shown at 67 and 68. Further strong vortices will be formed along the side of the body 18 adjacent the conduit side by flow through the orifice or opening 23, and such a vortex is shown at 69 in FIG. 3.

After the formation of these vortices 67, 68 and 69, the primary vortices will next be formed along the sides of the bars or flow obstruction bodies 16 and 18 defining orifice or opening 21, as shown in FIG. 4, and such vortices are shown at 70 and 71. The previous vortices 67, 68 and 69 are shown downstream slightly. Additional strong vortices will be formed along one side of the body 17 by flow through orifice or opening 24, as indicated at 72 in FIG. 4. As flow continues there is alternate "switching" or oscillation of the place of formation of strong or primary vortices and such alternation will cause a lateral vibration of the individual bars or bodies 16, 17 and 18. The vibration may be picked up by the transducer 26, and the frequency output will be recorded by suitable equipment well known in the prior art for recording high frequency vibrations. It should be noted that the end of the sensor shown in both FIGS. 2 and 5 is held snuggly at its outer end with a collar sleeve or other member which is shown only schematically in FIGS. 2 and 5.

As flow continues, the vortices will alternately switch back and forth in a stable pattern. The maximum output will be achieved when the previously recited preferred relationship between the sum of the widths (W) of the flow obstruction bars and the overall diameter (D) of the opening is maintained.

It should be noted that there will be a local restriction at the flowmeter plate because the diameter "D", which is the effective diameter in which the bars are placed is less than the diameter of the conduit itself. The diameter D should be no less than about 90% of the internal diameter of the conduit or pipe itself. If the opening diameter at the flowmeter plate is substantially less than 90% of the diameter of the pipe, turbulence will adversely affect the vortex generation.

The spacing between the individual bars is sufficiently close so that any vortex formed along the side of one bar which is adjacent another bar enhances, through a reinforcing action, the vortex formation along the next adjacent bar. Signal magnitudes on the order of 10 times the magnitudes obtained with a single bar can be obtained by addition of extra bars to obtain the desired coaction between the vortices formed. The spacing between adjacent bars is preferably substantially twice the width (W) of the bars.

If the bars are too close, the vortex shedding is adversely effected and the vortex pattern described does not occur resulting in a very erratic low level signal. For example if the spacing=W the signal is not useful.

With the plurality of bars, it has been found that the vortices will be shed uniformly along the length of the individual bars, and each of the bars affects positively the shedding of the vortices from the adjacent bars.

It has also been found that while three bars are useful, two bars can also be used providing a single orifice or opening between them and openings on the outer sides of the bars (between the sides of the conduit and the individual bars). Four bars can also be used if desired as will be shown. The plate from which the bars are formed is sufficiently thin so that it can be used in place of an orifice plate.

In the present device the bars are square that is, L=W. While L should not be substantially greater than W for best results, the bars can be thinner than they are wide. L should not be less than 0.6W for strong vortex formation, however.

In FIG. 6, a center bar 30 of a typical vortex flowmeter, such as that shown in FIGS. 1 through 7, is shown with a different type sensing unit. The bar 30 has an interior passageway 31, and a ceramic rod 32 is installed in this opening 31. It can be seen that the inner end 32A of the rod tightly fits into the opening 31, and the upper end 32B also tightly fits in this opening. A center portion 33 of the rod, which is of a reduced diameter carries capacitor plate members comprising spaced, oppositely facing metal film layers indicated at 34 and 35.

Suitable leads can be run from the respective capacitor plate members 34 and 35 up through the upper portion 32B of the ceramic rod, and then out through the opening in the center bar 30, as with the previous sensors.

In FIG. 7, a cross sectional view of the sensor is shown, and it can be seen that the side to side motion of the bar 30 indicated by the double arrows 36 will cause changes in capacitance as the bar 30 vibrates back and forth. The capacitance changes occur between the respective surfaces 34 and 35 and the surface portions on the interior of the opening which are adjacent to and aligned with these active capacitor portions. The spacing will change during vibration and this spacing change causes capacitance changes that can be detected with suitable capacitance detection equipment. The bar, as shown is a circular cross section cylindrical member, rather than triangular or rectilinear.

In FIG. 8, a further modified form of the invention is shown. In this form, an orifice plate 40 is provided with a peripheral rim 40A, and a pair of square cross section center bars 41 and 42, respectively. The bars 41 and 42 are defined by apertures or openings 43 and 44 which are part circular in their outer periphery, and are to the outside of the respective bars 41 and 42. A center aperture or opening 45 is defined between the two bars 41 and 42.

It can be seen that a first hole 46 is drilled from the edge surface of the rim 40A into the center of the bar 41, a second hole 47 is drilled from the edge surface of the rim 40A into the second bar 42. The upper portions of these holes are of larger diameter than the lower portions, and it can be seen that a ceramic rod 48 is inserted in the hole 46 and is securely held near its lower end 48A by reduced portion of the hole 46, and likewise a second ceramic rod 49 is inserted in the hole 47, and is held snuggly and securely adjacent its lower portion 49A as shown in FIG. 8. The rods 47 and 48 are moved back and forth as the bars 41 and 42 flex. Vibration of the bars 41 and 42 is caused by the formation of vortices along the side edges. It should be noted that the clearance of the holes 46 and 47 is selected to provide sufficient room for vibration.

The upper ends of the two bars 48 and 49 are connected by metal force bars 50 and 51, respectively, which in turn are attached to capacitor plates 52A and 52B. Leads 53A and 53B as shown lead from the plates 52A and 52B respectively. The motion of the ceramic rods moves these capacitor plates alternately toward and away from each other as vortices are shed from bars 41 and 42. Thus the capacitance as measured on leads 53A and 53B varies at the same frequency as the frequency of vortex shedding.

This arrangement has the advantage of cancelling in-phase vibration of the plates 52A and 52B induced by pipe or conduit vibration not related to vortex shedding since these vibrations will not cause relative motion of the two capacitor plates.

The mounting portions 48A and 49A are near the inflection point of the vibrating bars in order to get maximum motion transmitted externally to the sensing unit at the exterior of the plate. The motion of the bars at their inflection includes a rotating component which causes large angular rotation in the rods 47 and 48. This angular rotation causes a large deflection at the end of the rods and effectively amplifies the motion of the bars.

In FIG. 9, a cross sectional view of a typical orifice plate utilizing four bars, as opposed to the three bars and two bars shown previously, is illustrated. A vibration or motion sensor would be used in at least one of the bars and would be generally the same type as before. At least one of the bars in FIG. 9 would have an opening for receiving a sensor.

The plate 55 as shown has bars 56, 57, 58 and 59 defined therein. The opening in the plate would be circular as previously shown, in that the outer edges of the openings between each of the bars would be rounded to define an internal diameter D as shown in FIG. 2.

It has been found that in certain applications, certain combinations of bars in the sensor work better than others. For example, where water is flowing through a four inch diameter pipe at rates between one and 15 feet per second, a four bar configuration shown in FIG. 9 is found to provide high outputs. The bars shown are quarter inch square, that is, the plate itself is a quarter inch thick and the bars are a quarter inch wide. The spacing between the bars at the center plane of the plate (along a diametral line) is one half inch, or double the length of the bars in direction of the flow. Using a frequency to voltage analogue type output having a two second time constant, the analogue output variations are within one percent for the specific orifice plate 55 that is shown in FIG. 9.

In other configurations, up to a five percent analogue output variation is found. This variation (which may be called a fluctuation or ripple in the signal) is undesirable and a lower value gives more reliable information as to the flow rates.

Thus, in all forms of the combination the plurality of bars are utilized to enhance the output when vortices are formed along the side surfaces of the bars. It should be noted that when round bars are utilized, the facing surface portions actually are substantially half cylinders, but even with round bars, as well as with rectilinear or triangular bars, there are facing surface portions between adjacent bars. In a triangular cross section bar, one surface of the triangle could be normal to the flow direction.

In summary, the obstruction bars are formed on a plate so that they have an equal length dimension (L) in direction of flow, and are spaced side by side on a common bisecting plane transverse to the flow stream, and they are spaced sufficiently close laterally so that each reinforces the vortices formed at adjacent bars.

The flowmeter has bars that are centered in direction of the flow on a plane perpendicular to the flow direction and are spaced in direction transverse to the flow direction to cause the lateral alternation of primary vortex formation for strong signal ouput. There are no additional posts or obstructions either upstream or downstream of the transversely aligned bars that might dampen or destroy the vortex formation along alternate side surfaces of the transversely aligned bars.

Hollow or tubular square bars can be used to minimize mass and sensitivity to pipe vibrations. Triangular, round or other cross sections can also be used. Although the bars are shown as uniform in cross section along their length they could vary in cross section. The width of each bar could vary to correspond to the velocity profile along its length to enhance vortex shedding simultaneously along the entire length of each bar.

In addition, although the bars in a given flowmeter are shown to be the same width, the width of the various bars could also be individually proportioned to correspond to the velocity profile across the pipe to enhance simultaneous vortex shedding from all of the bars.

Piezoelectric and capacitive motion sensing have been described. However, other motion sensors could be employed, such as electromagnetic or optical for example.

While motion sensing of individual bars only has been described as the preferred design, where space permits, other means of sensing vortices could be employed, such as acoustic or thermal conduction probes positioned downstream (or upstream) of the vortex generating assembly.

What is claimed is:

1. A flowmeter of the vortex shedding type for a fluid flow conduit comprising a plurality of flow obstruction bodies being contoured to cause fluid flow separation and formation of vortices, means to mount said flow obstruction bodies in said conduit in position spaced from each other in a first direction transverse to the flow direction, said flow conduit having a cross section dimension in the first direction of "D", each of said flow obstruction bodies having at least one surface portion generally facing a surface portion of another obstruction body in direction transverse to the flow direction, the spacing of said obstruction bodies being such that vortices formed along one of said facing surface portions affects formation of vortices formed along other of said facing surface portions and reinforces the vortices so formed, and the total width of all flow obstruction bodies in the first direction being not substantially less than 0.2D, and sensor means to sense formation of vortices from at least one flow obstruction body.

2. The flowmeter of claim 1 wherein the obstruction bodies are generally rectilinear in cross section and are generally centered on a common plane normal to flow direction.

3. The flowmeter of claim 2 and a common support fixedly mounting said obstruction bodies.

4. The combination of claim 1 wherein the total width of said plurality of bodies measured transverse to the direction of flow is 0.2 to 0.3 of the effective diameter of the flow opening through said flowmeter.

5. The combination as specified in claim 1 wherein said means to mount mounts said obstruction bodies in position spaced laterally from each other sufficiently to permit vortices to be formed between said bodies, and with said bodies in a position wherein the vortices formed by said obstruction bodies are not substantially affected by additional obstruction bodies either upstream or downstream from said first mentioned plurality of flow obstruction bodies, and said sensor means sensing vortices formed only by said first mentioned flow obstruction bodies.

6. The flowmeter of claim 1 wherein the bodies have substantially equal width in direction transverse to the flow and the spacing between adjacent bodies is greater than the width of each of the adjacent bodies.

7. A flowmeter of the vortex shedding type for mounting in a flow conduit comprising an orifice plate having orifices defined therein which define a plurality of flow obstruction bars, said bars having central axes extending substantially parallel to each other in a first direction and being spaced apart in a second direction perpendicular to the first direction, said bars causing formation of vortices which are shed from surfaces of the bars, said bars being spaced sufficiently to permit formation of vortices between the bars, but sufficiently close so each bar affects positively the vortices formed on adjacent bars, and means to sense vortex generation from said bars.

8. The combination of claim 7 wherein said means to sense comprises means to sense motion of at least one of said bars.

9. The combination of claim 8 wherein there are three bars, and one of said bars is centered on a diametral line of said conduit, and the other bars are spaced an equal distance on opposite sides of said center bar.

10. The combination of claim 8 wherein at least one of said bars is tubular for at least a portion thereof, and fixed rod means spaced from the interior of said tubular portion, said means to sense comprising capacitive means to sense changes in spacing between said rod means and the interior surfaces of said tubular portion.

11. The combination of claim 7 wherein the orifices have edges that are part circular and wherein the width (W) of each bar, measured in the second direction is substantially equal to the width W of other bars, and the sum of width W is between 0.2 and 0.3 of the effective diameter of the flow opening through the flowmeter.

12. The combination of claim 11 wherein the bars each have a length L in direction of flow and the length L of each bar is not substantially greater than W and not substantially less than 0.6W.

13. A flowmeter of the vortex shedding type for mounting in a flow conduit comprising an orifice plate having orifices defined therein which define a plurality of four flow obstruction bars, said bars having central longitudinal axes extending substantially parallel to each other in a first direction transverse to the flow direction and being spaced apart in a second direction perpendicular to the first direction, said bars causing formation of vortices which are shed from surfaces of the bars, bars being spaced sufficiently to permit formation of vortices between the adjacent bars, but sufficiently close so each bar affects the vortices formed on adjacent bars in a positive manner to enhance strong vortex action, and means to sense vortex generation from said bars.

14. The combination of claim 13 wherein the bars each have a width W in a direction perpendicular to flow and the spacing between adjacent bars is substantially equal to 2W and 4W is substantially equal to between 0.2 and 0.3 of the effective flow diameter.

15. The combination of claim 14 wherein the length L in direction of flow is substantially equal to between 0.6W and W.

16. A flowmeter of the vortex shedding type for a flow conduit comprising a plurality of flow obstruction bodies contoured to cause flow separation and formation of vortices, means to mount said flow obstruction bodies in said conduit in position spaced from each other in direction transverse to the flow direction, comprising a ring member surrounding said bodies and having a peripheral edge, each of said obstruction bodies having at least one surface portion facing a surface portion of another obstruction body, the spacing of said obstruction bodies being such that vortices formed along one of said facing surface portions enhances formation of vortices formed along the other of said facing surface portions, said ring having a receptacle defined therein extending from said peripheral edge into the interior of one of said flow obstruction bodies, and a piezoelectric sensor mounted in said receptacle to sense vibration of said one obstruction body caused by formation of vortices.

17. A flowmeter of the vortex shedding type for a fluid flow conduit comprising a plate relatively thin in the direction of flow in said conduit, said plate having flow openings defined therein to form a plurality of flow obstruction bodies between the openings in said plate contoured to cause flow separation and formation of vortices in said conduit, means to mount said plate in position with said flow obstruction bodies in said conduit, said bodies being spaced from each other in direction transverse to the flow direction, each of said flow obstruction bodies having at least one surface portion generally facing a surface portion of another flow obstruction body in direction transverse to the flow direction, the spacing of said flow obstruction bodies being such that vortices formed along one of said facing surface portions affects formation of vortices formed along the other of said facing surface portions and reinforces the vortices so formed, and sensor means to sense formation of vortices from at least one flow obstruction body.

18. The combination of claim 17 wherein there are at least two obstruction bodies comprising said flowmeter, a pair of rod means connected to each of said two bodies, motion sensor means connected between said rod means to detect opposed motion of said bodies.

19. A flowmeter of the vortex shedding type for a flow conduit comprising a plurality of at least three flow obstruction bodies contoured to cause flow separation and formation of vortices, means to mount said flow obstruction bodies in a common assembly within said conduit in position with the flow obstruction bodies spaced from each other in direction transverse to the flow direction with the flow obstruction bodies centered with respect to the central axis of the flow conduit, each of said flow obstruction bodies having at least one surface portion generally facing a surface portion of another flow obstruction body in direction transverse to the flow direction, the spacing of said flow obstruction bodies being such that vortices formed along one of said facing surface portions affects formation of vortices formed along the other of said facing surface portions and reinforces the vortices so formed, and sensor means to sense formation of vortices from at least one flow obstruction body.

* * * * *